(12) United States Patent
Asano

(10) Patent No.: US 7,894,716 B2
(45) Date of Patent: Feb. 22, 2011

(54) OPTICAL APPARATUS WITH A PLURALITY OF SELECTABLE AUTO-FOCUS AREAS WITHIN A FOCUS-RANGE

(75) Inventor: Takurou Asano, Kawachi-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 12/060,957

(22) Filed: Apr. 2, 2008

(65) Prior Publication Data

US 2008/0247742 A1    Oct. 9, 2008

(30) Foreign Application Priority Data

Apr. 6, 2007 (JP) .............................. 2007-100110

(51) Int. Cl.
*G03B 13/34* (2006.01)
*G03B 3/10* (2006.01)
(52) U.S. Cl. ...................... 396/123; 396/103; 396/128; 348/349
(58) Field of Classification Search ................. 396/103, 396/123, 128; 348/349
See application file for complete search history.

(56) References Cited

U.S. PATENT DOCUMENTS

| | | | |
|---|---|---|---|
| 5,333,028 A | 7/1994 | Akashi et al. | |
| 6,157,782 A * | 12/2000 | Aoyama | 396/104 |
| 6,175,692 B1 * | 1/2001 | Onoda et al. | 396/104 |
| 6,327,436 B2 * | 12/2001 | Kawabe et al. | 396/121 |
| 6,456,788 B1 * | 9/2002 | Otani | 396/51 |
| 6,512,888 B2 * | 1/2003 | Aoyama | 396/121 |
| 6,584,284 B1 | 6/2003 | Odaka | |
| 7,634,186 B2 * | 12/2009 | Nojima | 396/103 |
| 2007/0058962 A1 * | 3/2007 | Natsume et al. | 396/103 |
| 2007/0064145 A1 * | 3/2007 | Sugimoto | 348/345 |

FOREIGN PATENT DOCUMENTS

| | | |
|---|---|---|
| EP | 0 926 526 A2 | 6/1999 |
| JP | 04-114135 A | 4/1992 |
| JP | 05-297266 A | 11/1993 |
| JP | 2000-028903 | 1/2000 |
| JP | 2001-159730 A | 6/2001 |

OTHER PUBLICATIONS

Search Report from European Patent Office dated Jul. 24, 2008, issued on the European Counterpart Patent Application No. 08006490.0-1524.

* cited by examiner

*Primary Examiner*—Christopher E Mahoney
*Assistant Examiner*—Bret Adams
(74) *Attorney, Agent, or Firm*—Canon U.S.A., Inc. I.P. Division

(57) ABSTRACT

An optical apparatus includes a detector detecting information used for focus control in each of a plurality of detection areas set in an image-pickup area, a selecting member being operated to change a selected area selected from the plurality of the detection areas, and a controller performing the focus control based on the information detected by the detector in the selected area. The controller determines a selectable detection area among the plurality of the detection areas based on the information used for the focus control detected in each of the detection areas and changes the selected area among the selectable detection areas in response to the operation of the selecting member. The optical apparatus reduces burdens in a selecting operation of the detection area for information used for the focus control and allows selection of an intended detection area quickly.

9 Claims, 15 Drawing Sheets

OPTICAL APPARATUS WITH A PLURALITY OF SELECTABLE AUTO-FOCUS AREAS WITHIN A FOCUS-RANGE

BACKGROUND OF THE INVENTION

The present invention relates to an optical apparatus that performs focus control based on information regarding the focus control in a detection area selected from among a plurality of detection areas provided in an image-pickup area (image area).

An image-pickup system using a camera or an image-pickup lens is frequently configured so that the image area includes a plurality of detection areas and an auto focus (AF) is performed based on information regarding the focus control such as phase difference information or distance information obtained in a detection area (selected area) selected by an operator.

In the so-called multipoint AF as described above, known methods for allowing the operator to select the detection area for which focusing is desired to be made includes a so-called eye-gaze input method (see Japanese Patent Laid-Open No. 5-297266) and a touch panel method in which a to-be-selected area on a video display is touched by a finger (see Japanese Patent Laid-Open No. 2001-159730) for example. From the view point of an easy selecting operation (user-friendliness) and a simple configuration, another method is also frequently used in which an operation member such as a cross-shaped key switch is used to move selected areas one by one in the up-and-down direction and the left-and-right direction (Japanese Patent Laid-Open No. 4-114135).

However, the method for using the operation member to move selected areas one by one frequently causes a case where the detection area for which focusing is desired to be made must be selected through the state in which the detection area for which focusing is not to be made is selected. In the case where a great number of detection areas for which focusing is not to be made exist between the detection area for which focusing is desired to be made and a currently-selected detection area in particular, a great burden is caused on the operator because the operation may require a long time for the operation or the operator may make a quick operation to pass or miss the detection area that should be selected for example.

BRIEF SUMMARY OF THE INVENTION

The present invention provides the optical apparatus that reduces the burdens to the operator in the selecting operation of the detection area for information used for the focus control and that allows the operator to select an intended detection area quickly.

An optical apparatus as one aspect of the present invention includes a detector that detects information used for focus control in each of a plurality of detection areas set in an image-pickup area, a selecting member that is operated to change a selected area selected from the plurality of the detection areas, and a controller that performs the focus control based on the information used for the focus control detected by the detector in the selected area. The controller determines a selectable detection area among the plurality of the detection areas based on the information used for the focus control detected in each of the detection areas and changes the selected area among the selectable detection areas in response to the operation of the selecting member.

Other aspects of the present invention will be apparent from the embodiments described below with reference to the drawings.

DETAILED DESCRIPTION OF THE PREFERRED EMBODIMENTS

Exemplary embodiments of the present invention will hereinafter be described with reference to the accompanying drawings.

Embodiment 1

Figure 1:
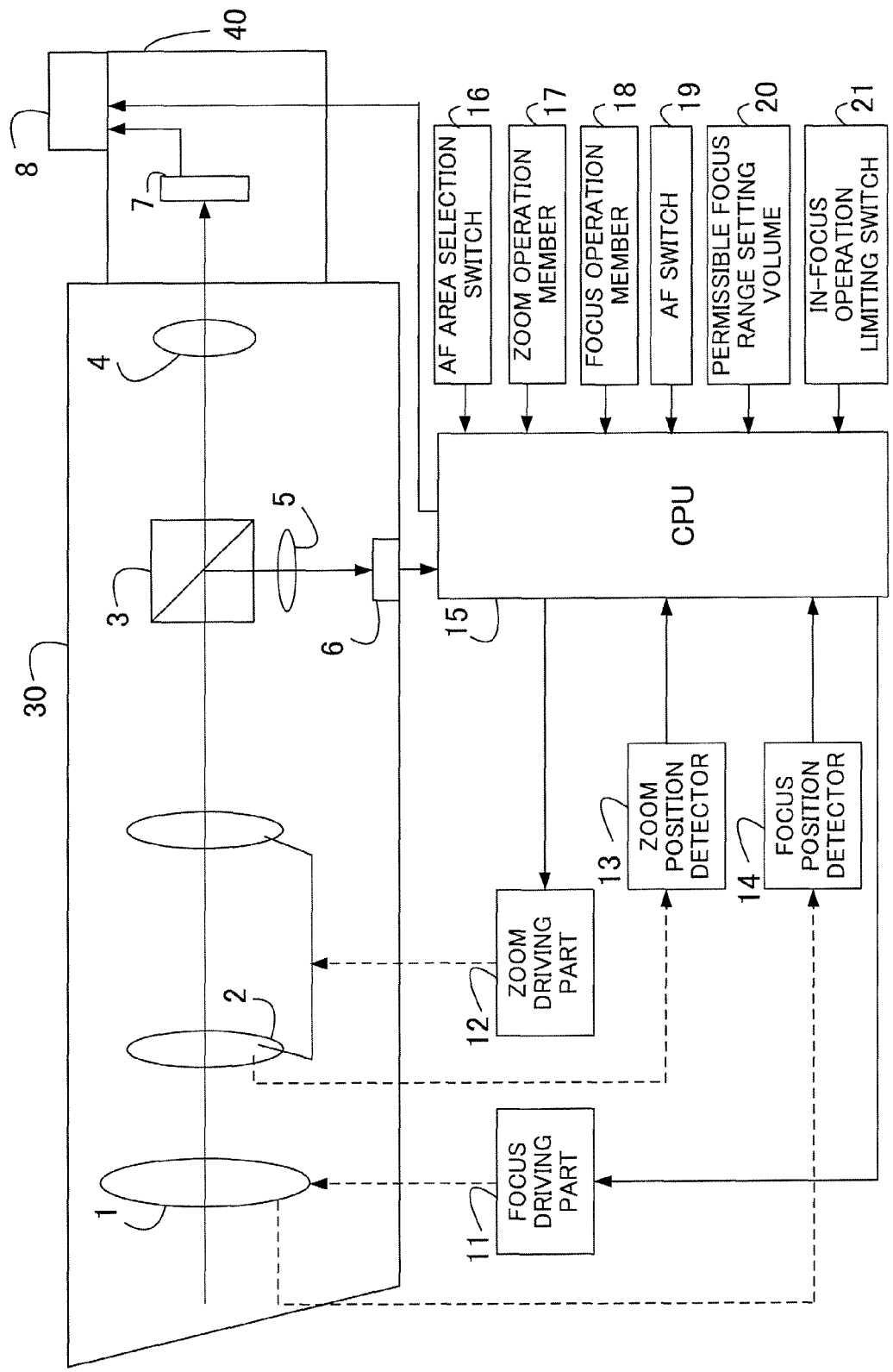
FIG. 1 is a block diagram showing the configuration of an image-pickup system including a zoom lens apparatus that is a first embodiment (Embodiment) 1 of the present invention.

FIG. 1 shows the configuration of an image-pickup system that is a first embodiment (Embodiment 1) of the present invention. Reference numeral 40 shows a camera such as a television camera or a video camera that performs image pickup by an image-pickup element 7 provided therein (e.g., CCD sensor, CMOS sensor).

Reference numeral 30 shows the zoom lens apparatus that is an optical apparatus detachably attached to the camera 40. In the zoom lens apparatus 30, reference numeral 1 shows a focus lens that is moved in an optical axis direction to perform focusing. Reference numeral 2 shows a magnification-varying lens that is moved in the optical axis direction to change a focal length.

A light flux from an object and passing the focus lens 1 and magnification-varying lens 2 is divided by a spectroscopic prism 3 into two light fluxes. One divided light flux transmitted through the spectroscopic prism 3 passes a relay lens 4 to reach the image-pickup element 7 in the camera 40.

The image-pickup element 7 photoelectrically-converts the object optical image formed on the light-receiving surface. An image processing circuit (not shown) in the camera 40 uses an output signal from the image-pickup element 7 to generate a video signal. The video signal is displayed in an electronic view finder (display element) 8 such as a liquid crystal display provided in the camera 40.

The other light flux reflected by the spectroscopic prism 3 passes a phase difference detection lens 5 to reach a phase difference detection sensor (detector) 6. The phase difference detection lens 5 divides the light flux from the spectroscopic prism 3 into a plurality of pairs of light fluxes.

Each of the plurality of pairs of light fluxes forms a pair of optical images (hereinafter referred to as two optical images) on different sensor areas on a phase difference detection sensor 6 that is an area sensor.

The phase difference detection sensor 6 photoelectrically-converts the two optical images formed on each sensor area to output a pair of electric signals (hereinafter referred to as a phase difference signal) depending on the light amount of the two optical images. The phase difference signal corresponds to information used for the focus control and information regarding a phase difference.

It is noted that the focus lens 1, the magnification-varying lens 2, and the relay lens 4 constitute an image-pickup optical system.

Reference numeral 11 denotes a focus driving part that drives the focus lens 1 based on an MF or AF control signal from a CPU 15 that is a controller. Reference numeral 19 is an AF switch that is operated to select an auto focus (AF) or a manual focus (MF).

When the AF switch 19 is OFF (MF), the CPU 15 generates the MF control signal based on information on the position of the focus lens 1 (hereinafter referred to as focus position) from a focus position detector 14 and information on an operation amount and an operation direction of the focus operation member 18. Then, the CPU 15 outputs the MF control signal to the focus driving part 11.

When the AF switch 19 is ON (AF), the CPU 15 calculates a focus position difference (a driving amount and a driving direction of the focus lens 1) based on the focus position and the phase difference signal for a selection AF area (selected area) among a plurality of focus detection areas (which will be described later). Then, the CPU 15 outputs an AF control signal to the focus driving part 11 so as to move the focus lens 1 to an in-focus position corresponding to the calculated focus position difference.

This will be described more specifically. The CPU 15 calculates the phase difference amount that is a dislocation amount of the phase difference signal to calculate a defocus amount of the image-pickup optical system based on the phase difference amount.

Figure 4:
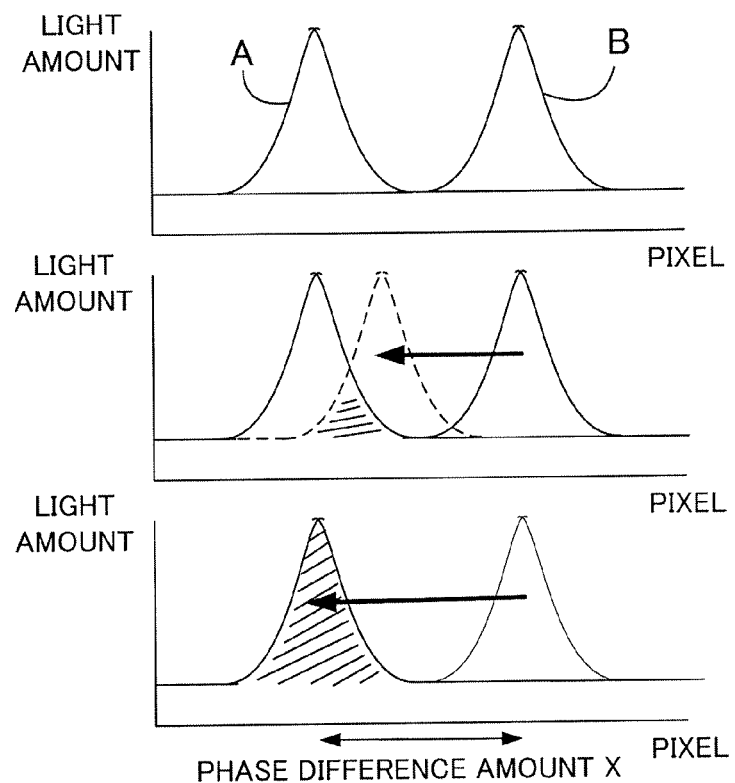
FIG. 4 illustrates a phase difference amount.

FIG. 4 shows an example of the phase difference signal. The signal A is a signal corresponding to the light amount of one optical image of the two optical images and the signal B is a signal corresponding to the light amount of the other optical image of the two optical images. While the signal B being shifted in a direction along which pixels in the sensor area (photoelectric conversion elements) are arranged, a correlation calculation method is used to calculate a coincidence degree with the signal A to determine that a shift amount up to a position coincident to the signal A as the phase difference amount X. The CPU 15 calculates the defocus amount (including the direction) that is a difference between an image-forming plane of the image-pickup optical system and a light-receiving surface of the image-pickup element 7 based on a difference between the phase difference amount X and a predetermined phase difference amount obtained in an in-focus state, a focus position, and the position of the magnification-varying lens 2 (hereinafter referred to as a zoom position).

The CPU 15 also calculates the above-described focus position difference (i.e., the driving amount and the driving direction of the focus lens 1 for obtaining an in-focus condition) based on the defocus amount, the current focus position, and the position sensitivity of the focus lens 1 for example. Then, the CPU 15 sends the AF control signal to the focus driving part 11 so as to move the focus lens 1 in the calculated driving direction by the calculated driving amount. As a result, the focus control (also called as an in-focus operation) by the phase difference detection method can be performed to the object in the selection AF area.

It is noted that the CPU 15 also has a function to use the phase difference signal obtained for the respective focus detection areas (the respective detection areas) to calculate the in-focus positions of the respective focus detection areas in order to determine an AF area candidate (which will be described later) from among 25 focus detection areas.

Reference numeral 12 denotes a zoom driving part that drives the magnification-varying lens 2 based on a zoom control signal from the CPU 15. The CPU 15 outputs the zoom control signal to a zoom driving part 12 based on the information on the position of the magnification-varying 2 obtained from the zoom position detector 13 (hereinafter referred to as the zoom position) and the information on the operation amount and the operation direction of a zoom operation member 17.

Reference numeral 20 denotes a permissible focus range setting volume that is operated in order to variably set a permissible focus range (the first predetermined range) within which the in-focus operation is performed by AF. The permissible focus range will be described later.

Reference numeral 21 denotes an in-focus operation limiting switch that switches whether the in-focus operation is limited to the permissible focus range set by the permissible focus range setting volume (the first changing operation member) 20 (ON) or not limited to this range (OFF).

Reference numeral 16 is the AF area selection switch (selecting member). The plurality of sensor areas on the phase difference detection sensor 6 described above are provided corresponding to a plurality of focus detection areas (the detection areas) in the image-pickup area.

Figure 5:
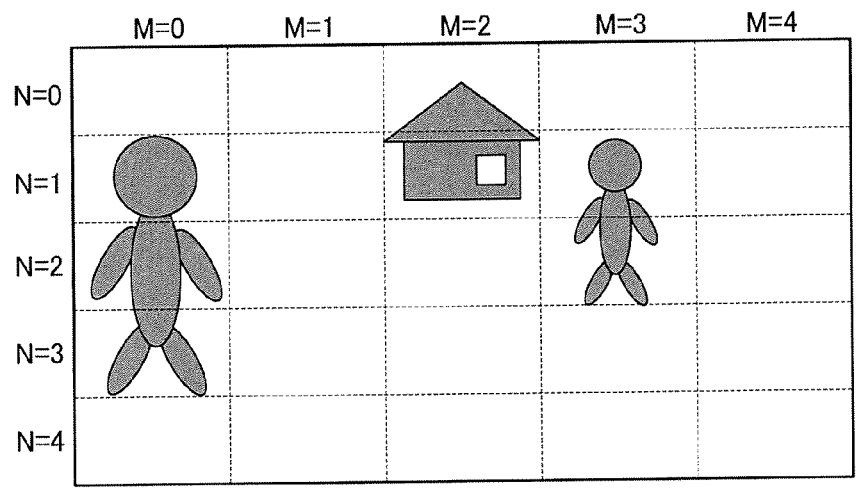
FIG. 5 shows a focus detection area in Embodiment 1.

FIG. 5 shows a plurality of focus detection areas in the image-pickup area. A rectangular frame of a thick line shows an outer edge of the image-pickup area. A plurality of small areas divided by dotted lines within the rectangular frame show the focus detection areas. FIG. 5 shows a case where the total of 25 focus detection areas are arranged so that 5 focus detection areas (N=0 to 4) are arranged in a vertical direction corresponding to a short side direction of the image-pickup element 7 (and the phase difference detection sensor 6) and 5 focus detection areas (M=0 to 4) are arranged in a horizontal direction corresponding to a long side direction. The phase difference detection sensor 6 includes 25 sensor areas that receive the two optical images formed by the light fluxes from the 25 object areas corresponding to the total of 25 focus detection areas, respectively.

Figure 8:
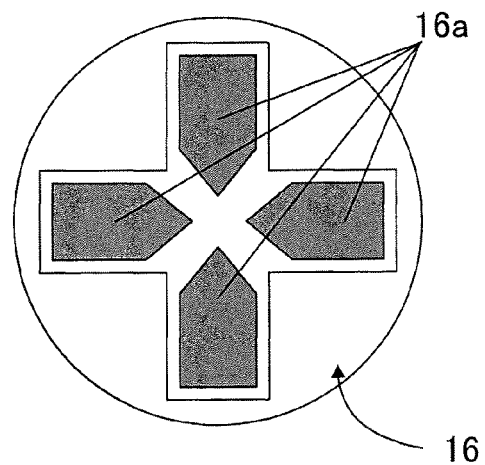
FIG. 8 shows an AF area selection switch in Embodiment 1.

As shown in FIG. 8, the AF area selection switch 16 includes a cross-shaped key switch. When any of buttons 16a arranged in the up-and-down direction and the left-and-right direction is depressed, one or a plurality of area(s) selected from among the 25 focus detection area so that the in-focus operation is performed in the area(s) (i.e., the selection AF area(s)) is/are moved in the up-and-down direction and the left-and-right direction. In other words, the AF area selection switch 16 is operated in order to change the selection AF area among the focus detection areas.

However, the focus detection area (the AF area candidate) that can be selected by the operation of the AF area selection switch 16 when the in-focus operation limiting switch 21 is ON is limited, for example, to those for which the in-focus position in the focus detection area is within the above-described permissible focus range.

Figure 2:
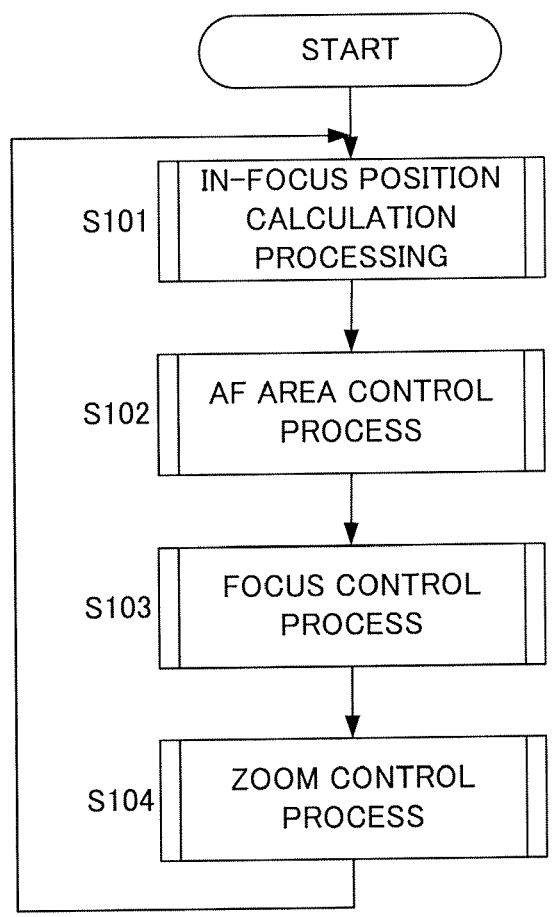
FIG. 2 is a flowchart showing a lens control process in Embodiment 1.

FIG. 2 is a flowchart showing the lens control process performed by the CPU 15. This process is performed based on a computer program (software) stored in the CPU 15.

Step (which is abbreviated as S in the drawings) 101 causes the CPU 15 to perform the in-focus position calculation process. The details of this process will be described later.

Step 102 causes the CPU 15 to perform the AF area control process. The details of this process also will be described later.

Step 103 causes the CPU 15 to perform the focus control process. The details of this process also will be described later.

Thereafter, Step 104 causes the CPU 15 to perform a zoom control process by moving the magnification-varying lens 2 in a direction corresponding to the operation direction of the zoom operation member 17 (a tele direction or a wide direction) with a speed depending on the operation amount.

Figure 3:
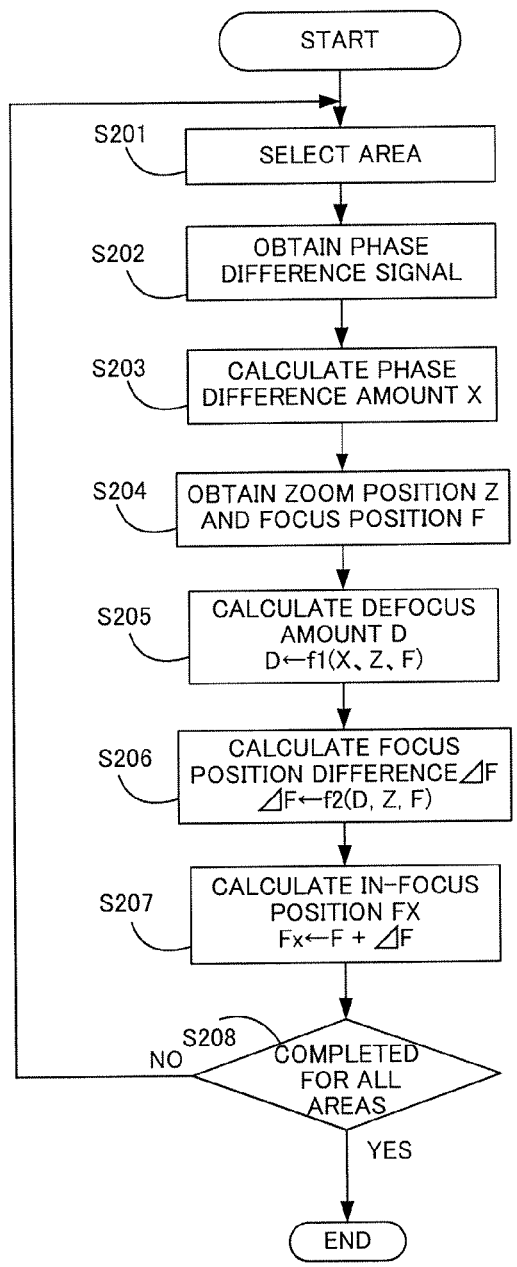
FIG. 3 is a flowchart showing an in-focus position calculation process in Embodiment 1.

With reference to FIG. 3, the in-focus position calculation process (Step 101) will be described in detail.

First, Step 201 causes the CPU 15 to select one focus detection area from among the above-described 25 focus detection areas.

Step 202 causes the CPU 15 to obtain the phase difference signal (a pair of electric signals depending on the light amount of the two optical images) from the sensor area corresponding to the selected focus detection area.

Next, Step 203 causes the CPU 15 to calculate the phase difference amount X corresponding to the dislocation amount of the two optical images on the phase difference detection sensor 6 based on the obtained phase difference signal.

Next, Step 204 causes the CPU 15 to obtain the zoom position Z and the focus position F obtained from the zoom position detector 13 and the focus position detector 14.

Step 205 causes the CPU 15 to use the phase difference amount X, the zoom position Z, and the focus position F obtained in the above processes to calculate the defocus amount D.

Then, Step 206 causes the CPU 15 to calculate the focus position difference $\Delta F$ based on the defocus amount D, the zoom position Z, the focus position F, and the position sensitivity of the focus lens 1 for example.

Next, Step 207 causes the CPU 15 to add the focus position F to the focus position difference $\Delta F$ to calculate the in-focus position Fx.

Step 208 causes the CPU 15 to determine whether or not the processes of Step 201 to Step 207 are already performed for all of the 25 focus detection areas. When the processes of Step 201 to Step 207 are not yet performed for all of the 25 focus detection areas, the process returns to Step 201 to cause the CPU 15 to select other focus detection areas to perform the processes after Step 202. When the processes of Step 201 to Step 207 are already performed for all of the 25 focus detection areas, the CPU 15 completes this process.

Then, the in-focus positions Fx[N][M](Fx[0][0], Fx[0][1], ..., Fx[4][4]) of the 25 focus detection areas are stored in a memory (not shown).

It is noted that, although this embodiment describes a case where the 25 focus detection areas shown in FIG. 5 are provided, this is an example and the number of the focus detection areas in the present invention is not limited to 25. Each of the focus detection area also may have any shapes and sizes that may be changed depending on the focal length (the zoom position).

Figure 6:
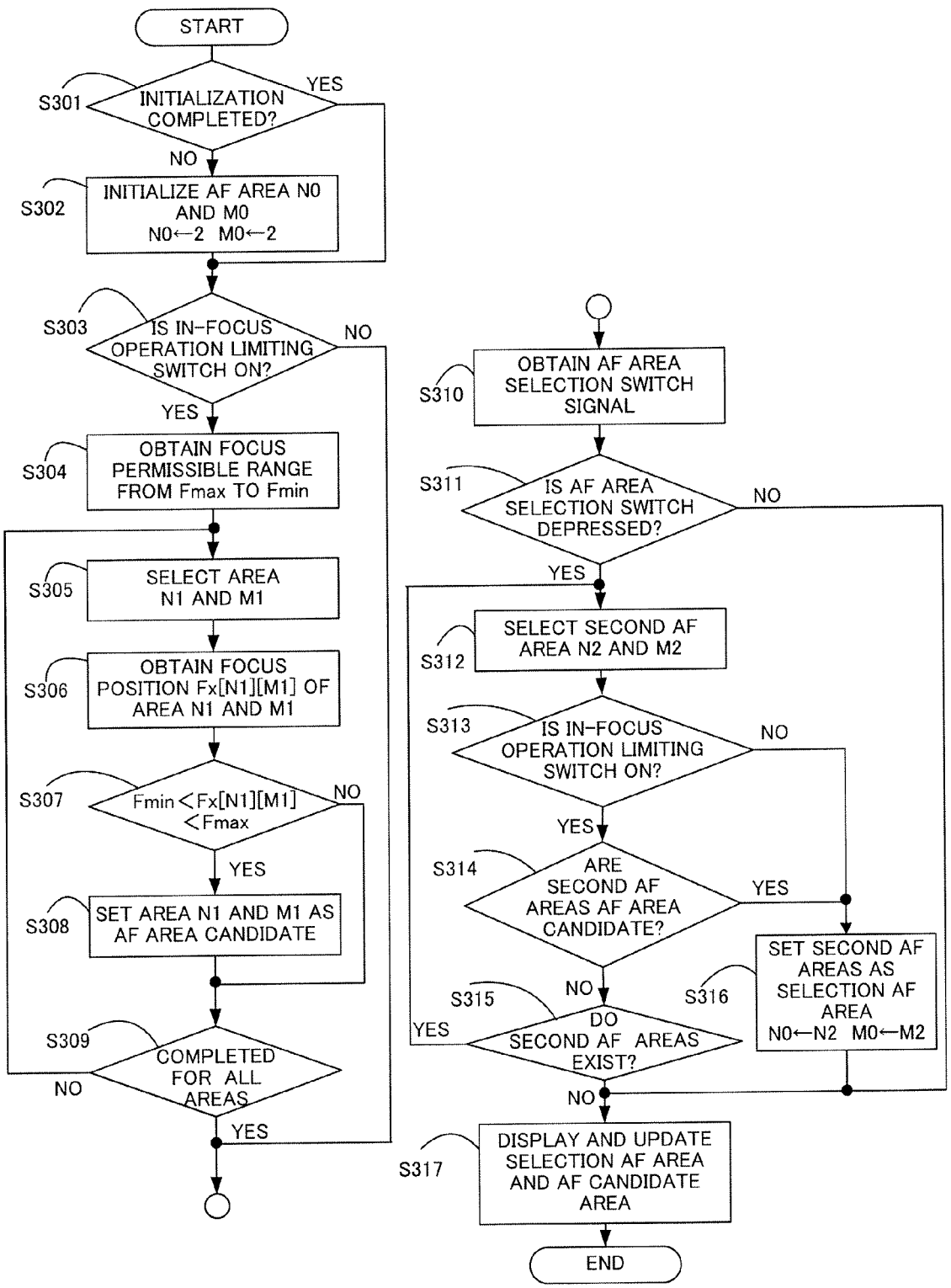
FIG. 6 is a flowchart showing an AF area control process in Embodiment 1.

With reference to FIG. 6, the AF area control process (Step 102) will be described in details.

First, Step 301 and Step 302 cause the CPU 15 to initialize N0 and M0 showing positions in the focus detection area. The focus detection area corresponding to the initialized N0 and M0 is the center focus detection area having N=2 and M=2.

Next, Step 303 causes the CPU 15 to determine whether or not the in-focus operation limiting switch 21 is ON. When the in-focus operation limiting switch 21 is OFF, the process jumps to Step 310. When the CPU 15 determines that the in-focus operation limiting switch 21 is ON, the process proceeds to Step 304.

Step 304 causes the CPU 15 to obtain Fmax and Fmin that are obtained by converting values at both ends of the permissible focus range set by the permissible focus range setting volume 20 to the focus position.

Although the permissible focus range is determined as an absolute range, the permissible focus range also may be a relative range having a predetermined width (a permissible focus range width) with reference to a current focus position or a target in-focus position (a target position of the focus control).

Figure 7:
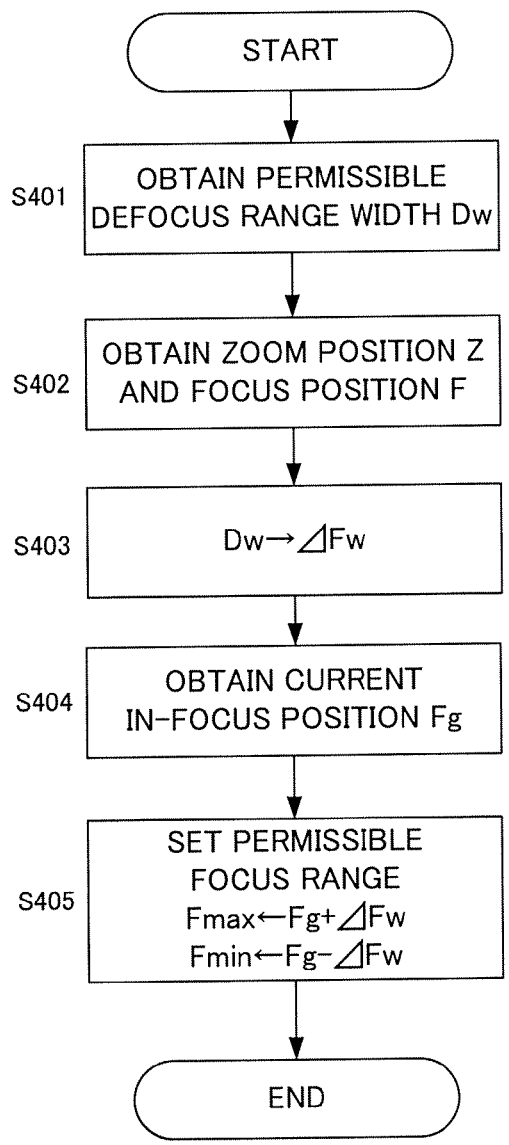
FIG. 7 is a flowchart showing a modified example of the AF area control process in Embodiment 1.

When the relative permissible focus range is used, the process in Step 304 is substituted with five steps shown in FIG. 7 for example.

In the example of FIG. 7, the relative permissible focus range having the center at the target in-focus position is used. In this case, Step 401 causes the CPU 15 to obtain a permissible defocus range width Dw that is a value obtained by reducing the permissible focus range width to the defocus amount in accordance with the operation of the permissible focus range setting volume 20.

Next, Step 402 causes the CPU 15 to obtain the zoom position Z and the focus position F.

Next, Step 403 causes the CPU 15 to convert the permissible defocus range width Dw to the permissible focus range width $\Delta Fw$.

Next, Step 404 causes the CPU 15 to obtain the target in-focus position Fg generated by the focus control process (which will be described later).

Step 405 causes the CPU 15 to set Fmax and Fmin that are the values at both ends of the permissible focus range to $Fg+\Delta Fw$ and $Fg-\Delta Fw$, respectively.

As described above, the setting of the relative permissible focus range can allow the permissible focus range to be flexibly set for a case where the distance to the object is changed significantly. Furthermore, a reference of the relative permissible focus range (e.g., the center) set as the target in-focus position can be used to set an appropriate permissible focus range even when the focus control has a poor followability to a focus control target. It is noted that the reference of the relative permissible focus range is not limited to the center of the range.

Returning to FIG. 6, Step 305 causes the CPU 15 to select one focus detection area from among all of the focus detection areas. Step 306 causes the CPU 15 to obtain the in-focus position Fx[N1][M1] obtained in the above-described in-focus position calculation process with regard to the focus detection area.

Step 307 causes the CPU 15 to compare the permissible focus range from Fmax to Fmin obtained by Step 304 with Fx[N1][M1] obtained in Step 306. When the CPU 15 determines that Fx[N1][M1] is within the permissible focus range (Fmin<Fx[N1][M1]<Fmax), the process proceeds to Step 308.

Step 308 causes the CPU 15 to determine the currently-selected focus detection area as the AF area candidate (i.e., an AF area that can be selected by the operation of the AF area selection switch 16 in order to perform the in-focus operation).

Step 309 causes the CPU 15 to determine whether the processes of Steps 305 to 308 are completed for all of the focus detection areas. When the processes of Steps 305 to 308 are not completed for all of the focus detection areas, the process returns to S305. When the processes of Steps 305 to 308 are completed for all of the focus detection areas, the process proceeds to Step 310.

Step 310 causes the CPU 15 to obtain an operation signal from the AF area selection switch 16. Step 311 causes the CPU 15 to determine whether or not the AF area selection switch 16 is operated. When the AF area selection switch 16 is not operated, the process jumps to Step 317. When the AF area selection switch 16 is operated, the process proceeds to Step 312.

Step 312 causes the CPU 15 to select other AF area candidates based on the position of the currently-selected AF area (the AF area candidate) and the signal from the AF area selection switch 16 to select second AF areas N2 and M2 having high priority from among these AF area candidates. The term "second AF areas" means the focus detection area for which whether or not the focus detection area is an AF area (the AF area candidate) that can be selected in accordance with an operation of the AF area selection switch 16.

Figure 9A:
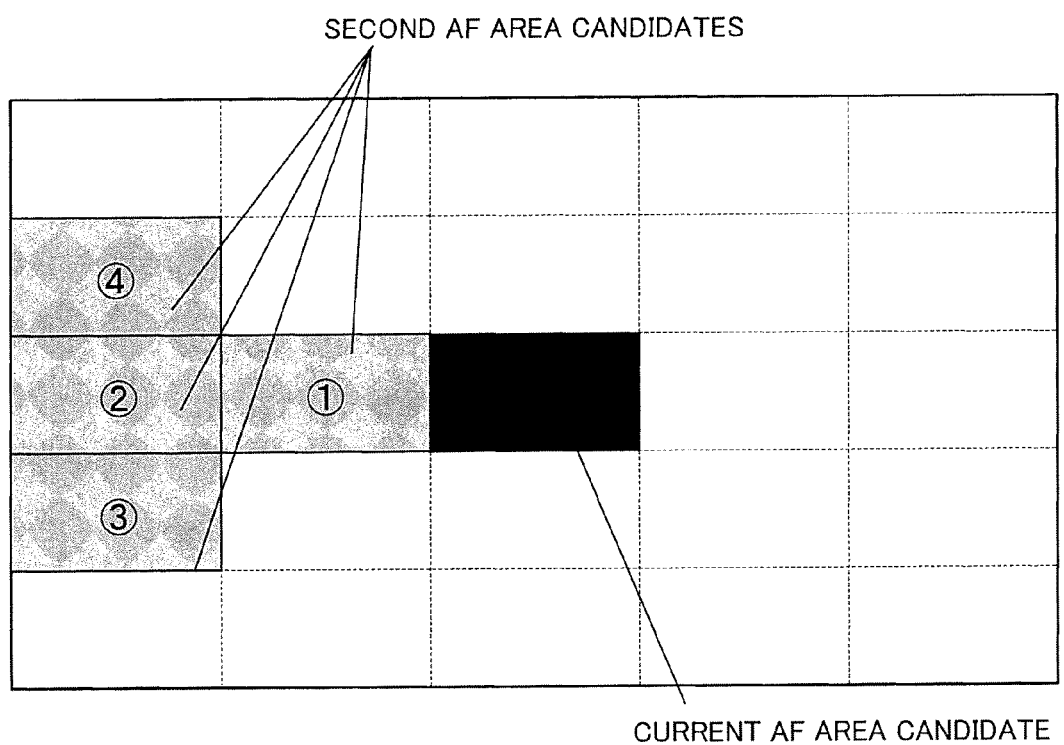
FIG. 9A shows an example of a check area and an AF candidate area in Embodiment 1.
Figure 9B:
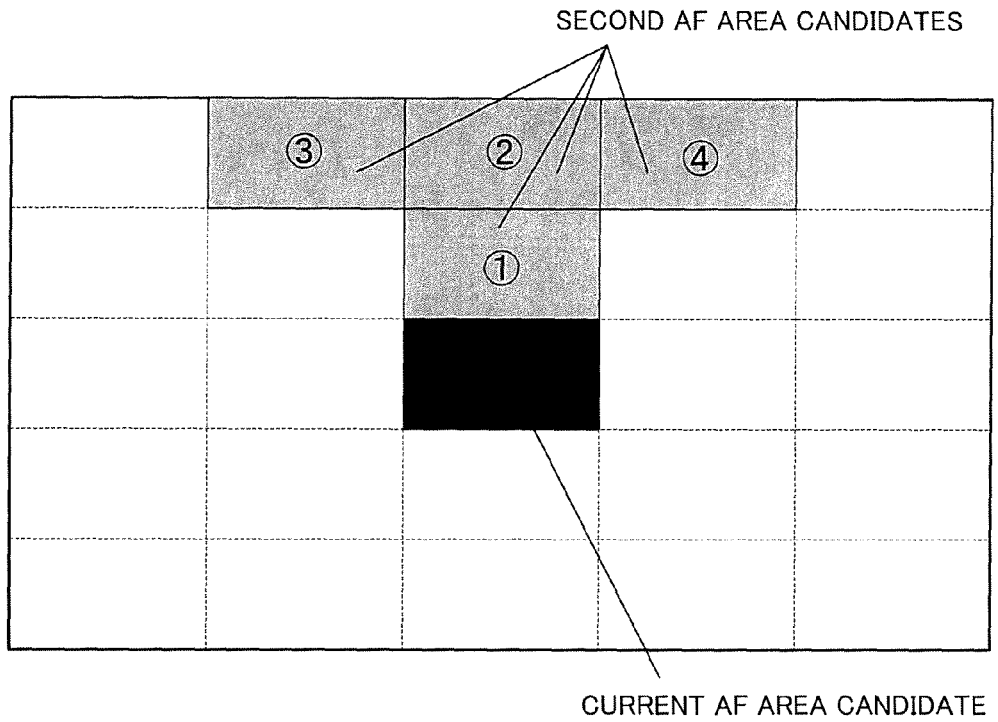
FIG. 9B shows another example of the check area and the AF candidate area in Embodiment 1.
Figure 9C:
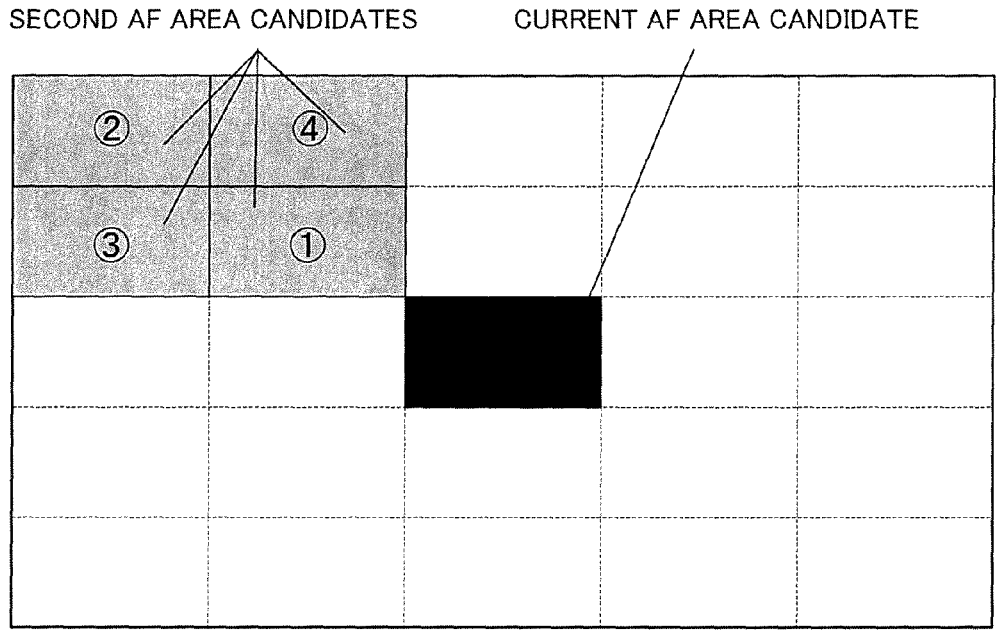
FIG. 9C illustrates still another example of the check area and the AF candidate area in Embodiment 1.

FIG. 9 shows an example of the AF area candidates and the order of priority thereof. FIG. 9A shows the AF area candidates when the left button of the AF area selection switch 16 is operated to specify the currently-selected AF area as the center area and the order of the priority thereof (in an order from 1 to 4 marked with circles). FIG. 9B shows the AF area candidates when the top button of the AF area selection switch 16 is operated to specify the currently-selected AF area as the center area and the order of the priority thereof (in an order from 1 to 4 marked with circles). FIG. 9C shows the AF area candidates when the left button and the top button of the AF area selection switch 16 are operated to specify the currently-selected AF area as the center area and the order of the priority thereof (in an order from 1 to 4 marked with circles).

In any of the above cases, the AF area candidate adjacent to the currently-selected AF area in the direction of any of buttons is determined as having a priority order 1. Similarly, the AF area candidate adjacent to the AF area having the priority order 1 in the direction of any of buttons when seen from the currently-selected AF area is determined as having an order of priority 2. Similarly, the AF area candidates adjacent to the AF area candidate having the order of priority 2 in a direction intersecting with the direction of the button are determined as having orders of priority of 3 and 4.

Step 313 causes the CPU 15 to determine whether or not the in-focus operation limiting switch 21 is ON. When the in-focus operation limiting switch 21 is OFF, the process proceeds to the Step 316 to set second AF areas N2 and M2 as the selection AF areas N0 and M0. On the other hand, when the CPU 15 determines that the in-focus operation limiting switch 21 is ON, the process proceeds to Step 314.

Step 314 causes the CPU 15 to determine whether or not second AF areas N2 and M2 are the AF area candidate. When the second AF areas N2 and M2 are the AF area candidate, the process proceeds to Step 316 to cause the CPU 15 to set the second AF areas N2 and M2 as the selection AF areas N0 and M0. When the second AF areas N2 and M2 are not the AF area candidate, the process proceeds to Step 315 to determine whether or not any other AF exists. So long as other AF areas exist, the CPU 15 repeats the processes of Step 312 to 314. When there is no any other AF areas, the process proceeds to Step 317.

Step 317 causes the CPU 15 to send an instruction to the camera 40 to display the contour of the current selection AF area surrounded with a white frame and the remaining plurality of the AF area candidates entirely colored with translucent gray in an electronic view finder 8. The electronic view finder 8 displays the white frame showing the selection AF area and the translucent gray areas showing the AF area candidates superimposed on the video being picked-up.

Through the AF area control process as described above, the focus detection areas other than the AF area candidate determined as an area that can be selected from among a plurality of focus detection areas (which are 25 focus detection areas in this embodiment) are prevented from being selected even when the AF area selection switch 16 is operated. Specifically, when the AF area selection switch 16 is operated while the focus detection area that cannot be selected exists between the current selection AF area and other selectable AF area candidates (non-selected selectable areas), the selection AF area jumps over the unselectable focus detection area to move to other AF area candidates. Furthermore, the AF area candidate is determined based on the permissible focus range that is arbitrarily set by the operator through the permissible focus range setting volume 20 (i.e., the permissible focus range reflecting an intention of the operator). Thus, the selection AF area can be changed with a reduced number of wasteful operations of the AF area selection switch 16 to reduce the burdens to the operator and the operator can quickly select the AF area for which focusing is desired to be made.

Figure 11A:
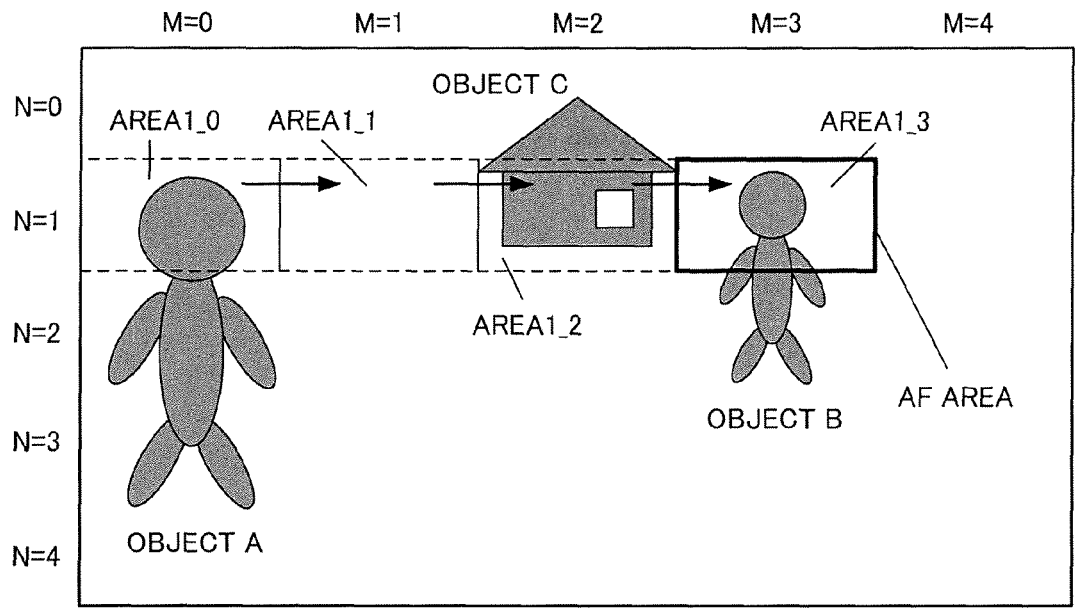
FIG. 11A shows a conventional AF area selection procedure.

FIG. 11A shows an example of an AF area selecting operation in a conventional zoom lens apparatus to move the selection AF area from a position corresponding to the object A to a position corresponding to the object B. The distance difference between the object A and the object B is small and the in-focus position exists within the permissible focus range in this embodiment. On the other hand, the object C is positioned away from the object A and has the in-focus position out of the permissible focus range. It is noted that the focus detection area having a position of N=n and M=m will be shown as a focus detection area n_m.

Conventionally, a single operation of the AF area selection switch provides the selection of one neighboring focus detection area as an AF area. Thus, the selection AF area must be moved from a focus detection area 1_0 corresponding to the object A to a focus detection area 1_3 corresponding to the object B through a state where the focus detection areas 1_1 and 1_2 positioned between the focus detection areas 1_0 and 1_3 are being selected. This causes an increased number of operations of the AF area selection switch, causing a burden to the operator. In addition, repeated operations of the AF area selection switch in a quick manner may cause the selection AF area to pass or miss the focus detection area 1_3 in spite of the intention.

Figure 11B:
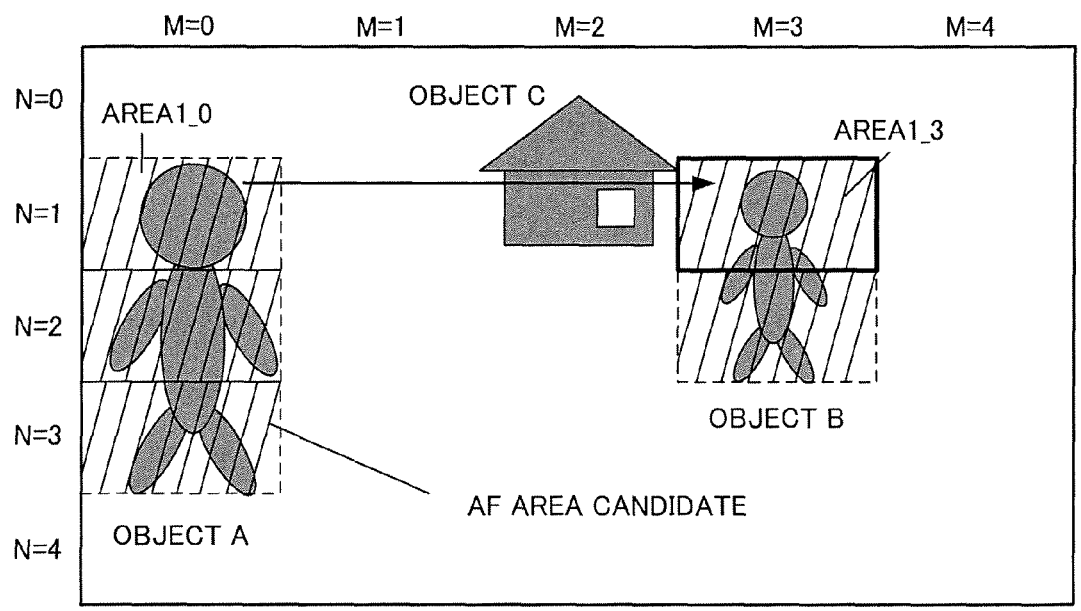
FIG. 11B shows an AF area selection procedure according to Embodiment 1.

On the other hand, FIG. 11B shows an example of the AF area selecting operation in the zoom lens apparatus 30 of this embodiment to move the selection AF area from the position corresponding to the object A to the position corresponding to the object B. In this case, the AF area candidates (non-selected selectable areas) within the permissible focus range are the focus detection areas 2_0 and 3_0 holding the object A existing in the current selection AF area 1_0 and the focus detection areas 1_3 and 2_3 holding the object B. Specifically, the focus detection areas 1_1 and 1_2 positioned between the current selection AF area 1_0 and the AF area candidate 1_3 are not the AF area candidate.

This allows only a single operation of the AF area selection switch 16 to instantly move the selection AF area from the current focus detection area 1_0 to the focus detection area 1_3. Thus, the burdens to the operator can be reduced and a probability can be also reduced where the operator may pass or miss the focus detection area 1_3 in spite of the intention.

Next, with reference to FIG. 10, the focus control process (Step 103) will be described in detail.

Step 501 causes the CPU 15 to determine the state of the AF switch 19. When the AF switch 19 is OFF, the process proceeds to Step 507 to obtain the operation amount from the focus operation member 18. Then, the process proceeds to Step 508 to generate and update the MF control signal. On the other hand, when the AF switch 19 is ON in Step 501, the process proceeds to Step 502.

Step 502 causes the CPU 15 to obtain the position N0 and M0 of the selection AF area obtained through the AF area control process. Step 503 causes the CPU 15 to obtain the in-focus position Fx[N0][M0] of the selection AF area.

Next, Step 504 causes the CPU 15 to determine the state of the in-focus operation limiting switch 21. When the in-focus operation limiting switch 21 is OFF, the process jumps to Step 508. On the other hand, when the in-focus operation limiting switch 21 is ON, the process proceeds to Step 505.

Step 505 causes the CPU 15 to obtain the permissible focus range from Fmax to Fmin set by the permissible focus range setting volume 20. Step 506 causes the CPU 15 to determine whether or not the in-focus position Fx[N0][M0] exists within this permissible focus range from Fmax to Fmin. It is noted that, when the permissible focus range is a relative range having the target in-focus position as a reference as described above, Step 505 is substituted with five steps shown in FIG. 7 as in the AF area control process.

When the in-focus position Fx[N0][M0] exists within the permissible focus range from Fmax to Fmin, the process proceeds to Step 508 to obtain and update the AF control signal based on the focus position difference AF (or the in-focus position Fx[N0][M0]) for this selection AF area. On the other hand, when the in-focus position Fx[N0][M0] does not exist within the permissible focus range from Fmax to Fmin, this process is completed without generating the AF control signal.

Embodiment 2

Figure 12:
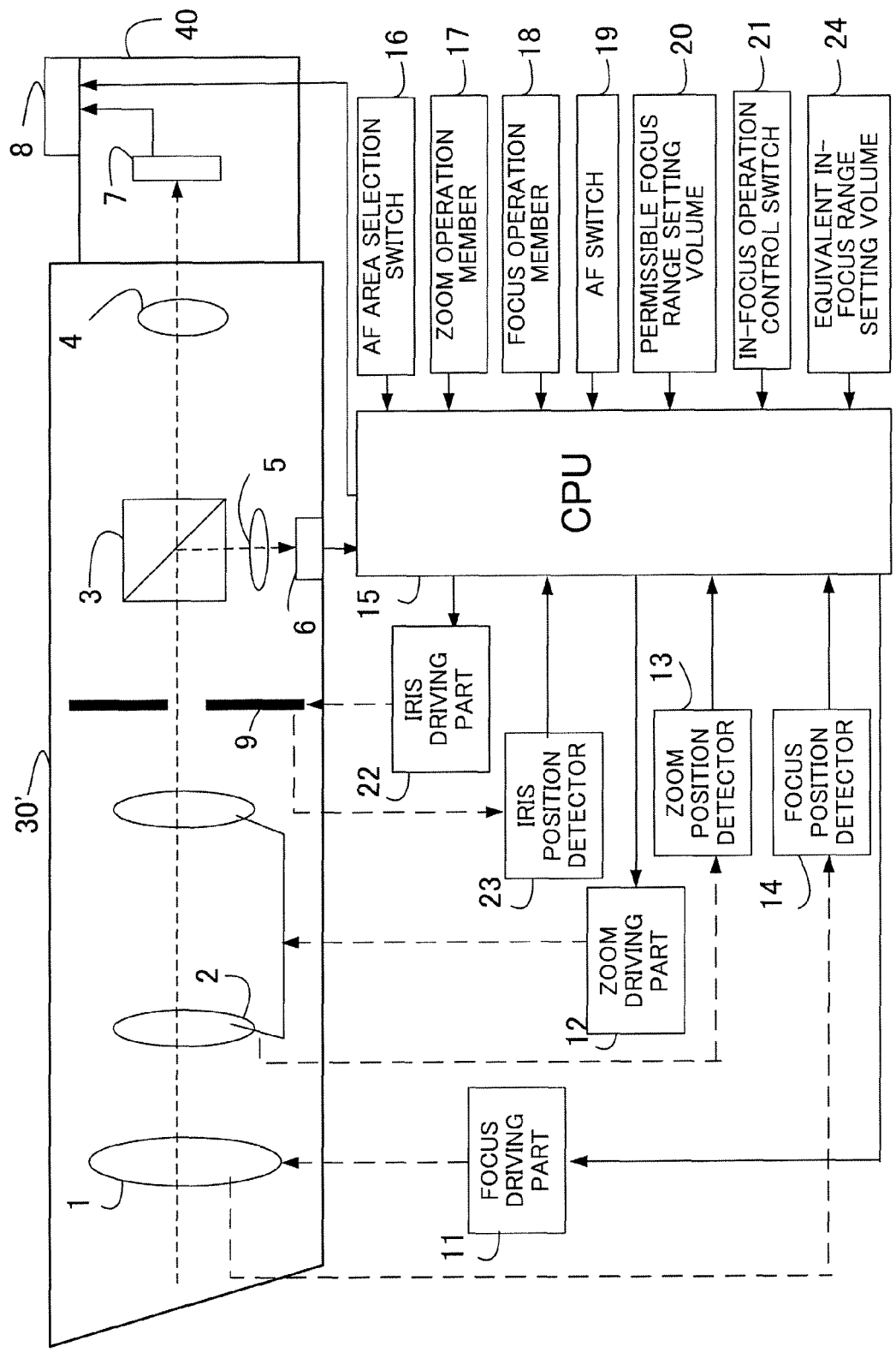
FIG. 12 is a block diagram showing the configuration of the image-pickup system including the zoom lens apparatus that is a second embodiment (Embodiment 2) of the present invention.

FIG. 12 shows the configuration of the image-pickup system that is Embodiment 2 of the present invention. In this embodiment, portions identical to those in Embodiment 1 are designated with the same reference numerals as those in Embodiment 1 and detailed description thereof is omitted.

In the image-pickup system of this embodiment, a zoom lens apparatus 30' is used and is attached to the same camera 40 as that of Embodiment 1.

The zoom lens apparatus 30' is configured to include the same constituting components as those of Embodiment 1 and the following constituting components.

Reference numeral 9 denotes an iris (aperture stop) constituting a part of the image-pickup optical system. Reference numeral 22 is an iris driving part that drives the iris so as to change the aperture diameter of the iris 9. Reference numeral 23 denotes an iris position detector that detects the aperture diameter of the iris 9 (stop value: hereinafter refereed to as an iris position).

Reference numeral 24 denotes an equivalent in-focus range setting volume (second changing operation member).

The equivalent in-focus range setting volume 24 is operated by the operator to variably set the maximum difference between the in-focus positions (range) (i.e., an equivalent in-focus position width (the second predetermined range)) so that the CPU 15 can determine that the in-focus positions in a plurality of the focus detection area adjacent to one another within this range are same or close to one another.

Among the lens control processes performed by the CPU 15, the in-focus position calculation process (Step 101 of FIG. 2), the focus control process (Step 103), and the zoom control process (Step 104) are basically the same as those of Embodiment 1. The AF area control process of this embodiment is different from that of Embodiment 1 and thus will be described.

Figure 13:
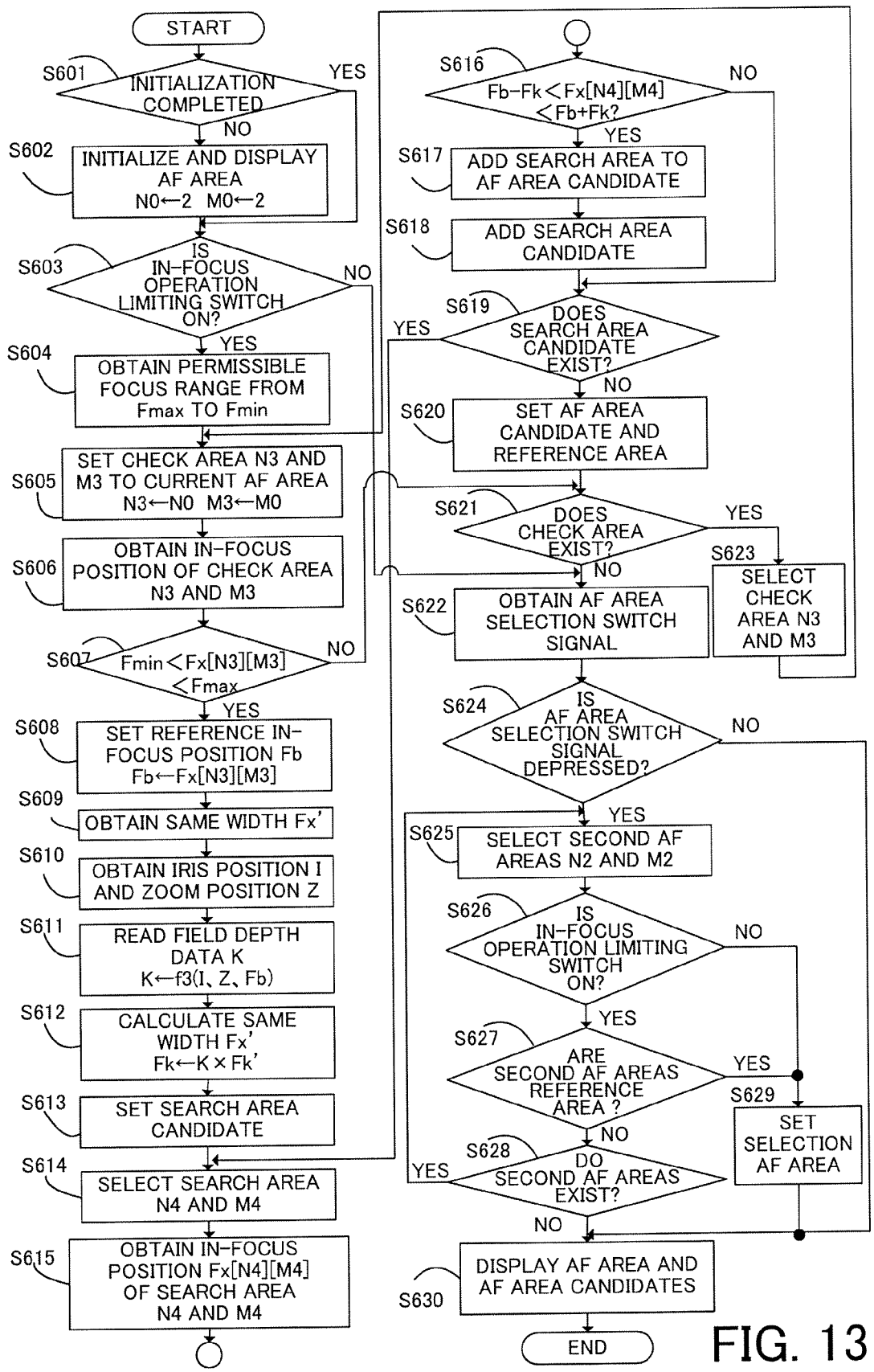
FIG. 13 is a flowchart showing the AF area control process in Embodiment 2.

FIG. 13 is a flowchart showing the AF area control process in this embodiment.

Step 601 and Step 602 cause the CPU 15 to initialize N0 and M0 that show a position in the focus detection area. The focus detection area corresponding to the initialized N0 and M0 is the focus detection area at the center of N=2 and M=2.

Next, Step 603 causes the CPU 15 to determine whether or not the in-focus operation limiting switch 21 is ON. When the in-focus operation limiting switch 21 is OFF, the process jumps to Step 622. When the CPU 15 determines that the in-focus operation limiting switch 21 is ON, the process proceeds to Step 604.

Step 604 causes the CPU 15 to obtain the values at both ends of the permissible focus range set by the permissible focus range setting volume 20 as Fmax and Fmin that are values obtained by the conversion to the focus position. As in Embodiment 1, the permissible focus range may be the relative range having the predetermined width with reference to the current focus position or the target in-focus position.

Next, Step 605 causes the CPU 15 to set the check area N3 and M3 as the currently-selected focus detection area N0 and M0. The check area means an area that is a reference to determine the AF area candidate. The AF area candidate means, as in Embodiment 1, the focus detection area that can be selected by the operation of the AF area selection switch 16 in order to perform the in-focus operation.

Next, Step 606 causes the CPU 15 to obtain the in-focus position Fx[N3][M3] in the check area obtained through the in-focus position calculation process.

Next, Step 607 causes the CPU 15 to compare the permissible focus range from Fmax to Fmin obtained in Step 604 with the in-focus position Fx[N3][M3] obtained in Step 606. When the in-focus position Fx[N3][M3] is out of the permissible focus range from Fmax to Fmin, this check area is not set to the AF area candidate and the process jumps to Step 621. On the other hand, when the in-focus position Fx[N3][M3] is within the permissible focus range from Fmax to Fmin (Fmin<Fx[N3][M3]<Fmax), the process proceeds to Step 608.

Step 608 causes the CPU 15 to set the in-focus position Fx[N3][M3] in the check area as a reference in-focus position Fb.

Next, Step 609 causes the CPU 15 to obtain an equivalent in-focus position width Fk' from the equivalent in-focus range setting volume 24.

Next, Step 610 causes the CPU 15 to compare the iris position I from an iris position detector 23 with the zoom position Z from the zoom position detector 13.

Step 611 causes the CPU 15 to read depth data K corresponding to a field depth from a data table stored in the CPU 15 based on the three parameters of the iris position I, the zoom position Z, and the reference in-focus position Fb set in Step 608. It is noted that, instead of reading the depth data K from the data table, the depth data K also may be calculated by the three parameters and an arithmetic expression.

Then, Step 612 causes the CPU 15 to multiply the field depth data K with the equivalent in-focus position width Fk' to set the result as the equivalent in-focus position width Fk. The equivalent in-focus position width Fk is obtained by reducing the equivalent in-focus position width Fk' to have a width depending on the iris position I and the zoom position Z. Specifically, the equivalent in-focus position width Fk shows the width of the in-focus position difference by which it can be determined that the object distances are same or close to each other. The equivalent in-focus position width Fk set so as to be proportional to the field depth can allow the operator to have a sense close to the determination by the software that the object distances are same or close to each other.

Step 613 causes the CPU 15 to select a search area candidate based on the position of the check area. The search area candidate is the focus detection area adjacent to the check area for which whether or not the focus detection area is the AF area candidate having the in-focus position within the equivalent in-focus position width Fk to the check area is determined.

Step 614 causes the CPU 15 to set one search area N4 and M4 for which whether or not the AF area candidate having the in-focus position within the equivalent in-focus position width Fk exists among the search area candidates is determined.

Step 615 causes the CPU 15 to obtain the in-focus position Fx[N4][M4] of the search area N4 and M4.

Step 616 causes the CPU 15 to determine whether or not Fx[N4][M4] is within the range of the equivalent in-focus position width Fk having a reference (a center) at the reference in-focus position Fb set in Step 608 (Fb−Fk<Fx[N4][M4]<Fb+Fk). When Fx[N4][M4] is within this range, the process proceeds to Step 617.

Step 617 causes the CPU 15 to add the current search area N4 and M4 to the AF area candidate (the equivalent in-focus position AF area candidate) that is regarded as having the in-focus position equivalent to that of the check area. Step 618 causes the CPU 15 to add the AF area candidate adjacent to the search area to the search area candidate. Then, the process proceeds to Step 619.

On the other hand, when the CPU 15 determines that Fx[N4][M4] is not within this range in Step 616, the process directly proceeds to Step 619. Step 619 causes the CPU 15 to determine whether or not the search area candidate exists. When the search area candidate exists, the process returns to Step 614. Step 614 causes the CPU 15 to select another area from among the search area candidates as the search area N4 and M4.

On the other hand, in Step 619, when the CPU 15 determines that the search area candidate does not exist, the process proceeds to Step S620.

Step 620 causes the CPU 15 to set the check area and the AF area candidate having the in-focus position equivalent to that of the check area as a pair of AF area candidates. It is noted that the check area is set as a reference area to determine the in-focus position in the one pair of AF area candidates.

Specific description will be made of processes from Step 604 to 620 with reference to FIG. 14A to FIG. 14D.

Figure 14A:
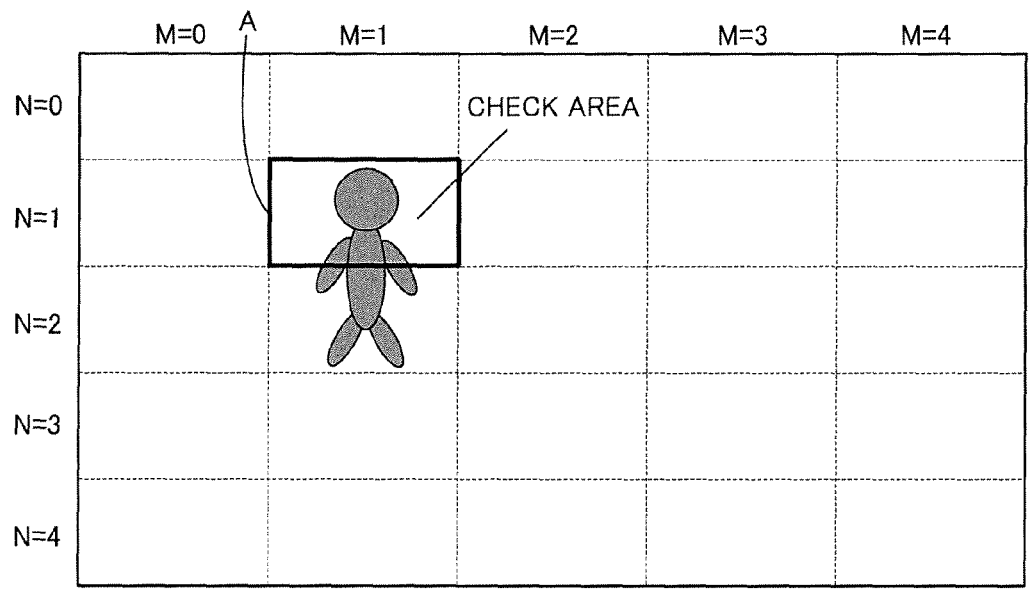
FIG. 14A shows an example of a check candidate in Embodiment 2.

In FIG. 14A, the object A exists within the permissible focus range set by the permissible focus range setting volume 20 with regard to the currently-selected focus detection area 1_1 (the check area). It is assumed that in-focus positions at the focus detection areas 1_1 and 2_1 are identical.

Step 604 causes the CPU 15 to obtain a focus range from Fmax to Fmin. Then, step 605 causes the CPU 15 to set the currently-selected focus detection area 1_1 as the check area as shown in FIG. 14A. Next, Step 606 causes the CPU 15 to obtain the in-focus position Fx[1][1] of the check area 1_1. Step 607 causes the CPU 15 to determine whether or not the in-focus position Fx[1][1] is within the permissible focus range obtained in Step 604.

In this example, the in-focus position Fx[1][1] is within the permissible focus range. Thus, the process proceeds to Step 608 to cause the CPU 15 to set the reference in-focus position Fb as Fx[1][1]. Steps 609 to 612 cause the CPU 15 to calculate the equivalent in-focus position width Fk based on the iris position I, the zoom position Z, the reference in-focus position Fb, and the equivalent in-focus position width Fk'.

Figure 14B:
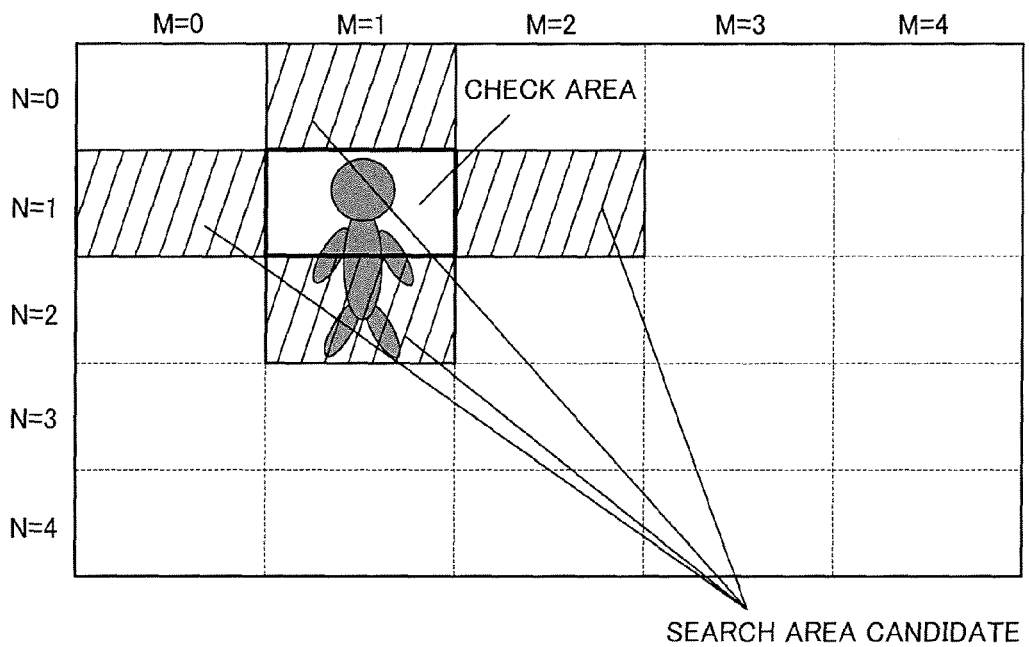
FIG. 14B shows an example of a search area candidate in Embodiment 2.

As shown in FIG. 14B, step 613 causes the CPU 15 to set four focus detection areas (0_1, 1_0, 1_2, and 2_1) adjacent to the check area as the search area candidate.

Next, Steps 613 to 616 cause the CPU 15 to search the search area candidate having the in-focus position within the equivalent in-focus position width Fk' with regard to the in-focus position of the check area 1_1 from among the four search area candidates. In this example, the focus detection area 2_1 has the same in-focus position with regard to the check area 1_1. Thus, the focus detection area 2_1 is selected as the search area. Then, the process proceeds to Step 617.

Figure 14C:
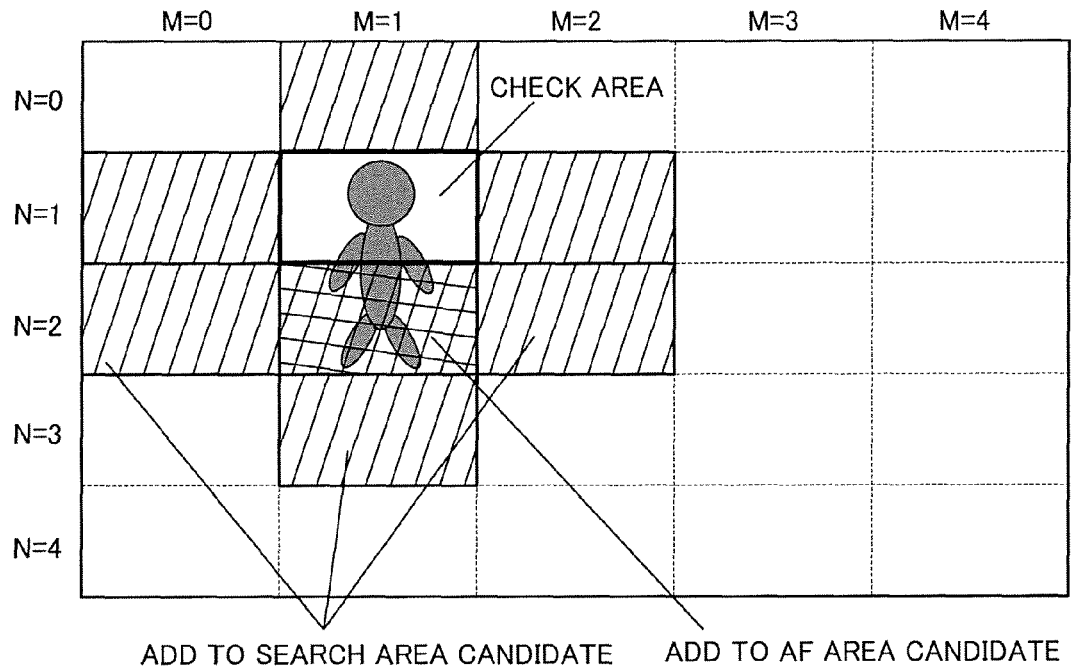
FIG. 14C shows an additional example of the AF candidate area and the search area candidate in Embodiment 2.

Step 617 causes the CPU 15 to add the search area 2_1 to the AF area candidates. As shown in FIG. 14C, step 618 causes the CPU 15 to add the three focus detection areas (areas 2_0, 2_2, and 3_1) adjacent to the search area 2_1 to the search area candidates. In this example, the added three focus detection areas do not include an area having the in-focus position within the equivalent in-focus position width Fk' with regard to the in-focus position of the check area 1_1. Thus, the process proceeds to Step 620 instead of proceeding to Step 617 again.

Figure 14D:
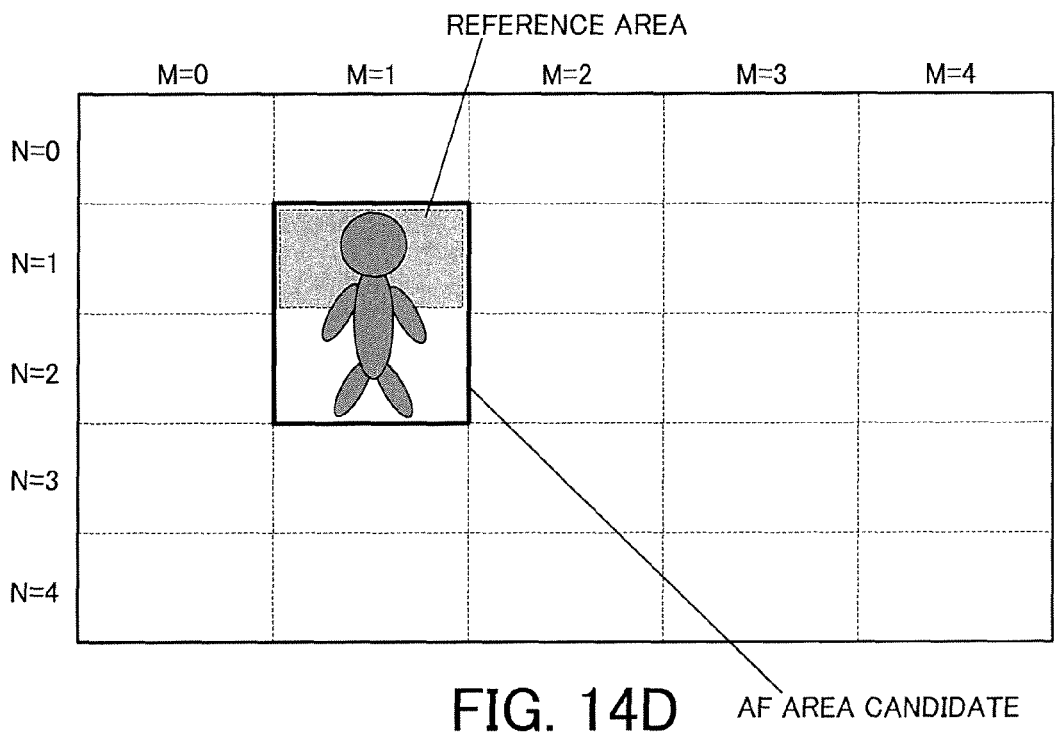
FIG. 14D shows an example of the AF candidate area in Embodiment 2.

As shown in FIG. 14D, step 620 causes the CPU 15 to decide one pair of AF area candidates including the area 1_1 and the area 2_1 added in Step 617 based on the check area 1_1 as a reference area. In the manner as described above, the AF area candidate is set.

Next, Step 621 causes the CPU 15 to determine whether or not any unchecked check area exists. When the unchecked check area exists, the process proceeds to Step 623 to select the check area again to repeat the processes of Steps 605 to 620.

Although the check area is selected from among all focus detection areas, any focus detection area once selected as the AF area candidate is not selected as the check area.

When the above check of all of the focus detection areas is completed, the process proceeds to the Step 622 to cause the CPU 15 to obtain the operation signal from the AF area selection switch 16.

Then, Step 624 causes the CPU 15 to determine whether or not the AF area selection switch 16 is operated. When the CPU 15 determines that the AF area selection switch 16 is not operated, the process jumps to Step 630. On the other hand, when the CPU 15 determines that the AF area selection switch 16 is operated, the process proceeds to Step 625.

Step 625 causes the CPU 15 to select second AF area candidates and second AF areas based on the position of the current selection AF area and the direction corresponding to the operation signal of the AF area selection switch 16. The second AF area candidates and the order of priority and the second AF areas are as shown in FIGS. 9A to 9C.

Step 626 causes the CPU 15 to determine whether or not the in-focus operation limiting switch 21 is ON. When the in-focus operation limiting switch 21 is OFF, the process proceeds to Step 629 to set the second AF areas as the selection AF area. On the other hand, when the in-focus operation limiting switch 21 is ON, the process proceeds to Step 627.

Step 627 causes the CPU 15 to determine whether or not the selected second AF areas are the reference area of the AF area candidate. When the selected second AF areas are the reference area of the AF area candidate, the process proceeds to Step 629 to cause the CPU 15 to set one pair of AF area candidates including the reference area as the selection AF area. When the CPU 15 in Step 627 determines that the selected second AF areas are not the reference area, the process proceeds to Step 628.

Step 628 causes the CPU 15 to determine whether or not any second AF areas exist. When any second AF areas exist, the process returns to Step 625 to repeat the processes of Steps 625 to 628. On the other hand, when any second AF areas do not exist, the process proceeds to Step 630.

Step 630 causes the CPU 15 to send an instruction to the camera 40 to display the current selection AF area and the AF area candidates other than the current selection AF area in the electronic view finder 8. However, the CPU 15 in this embodiment instructs the camera 40 to display the thick line showing the outer frame of the selection AF area so that the selection AF area other than the AF area candidates is highlighted. In this manner, the AF area control process is completed.

Figure 10:
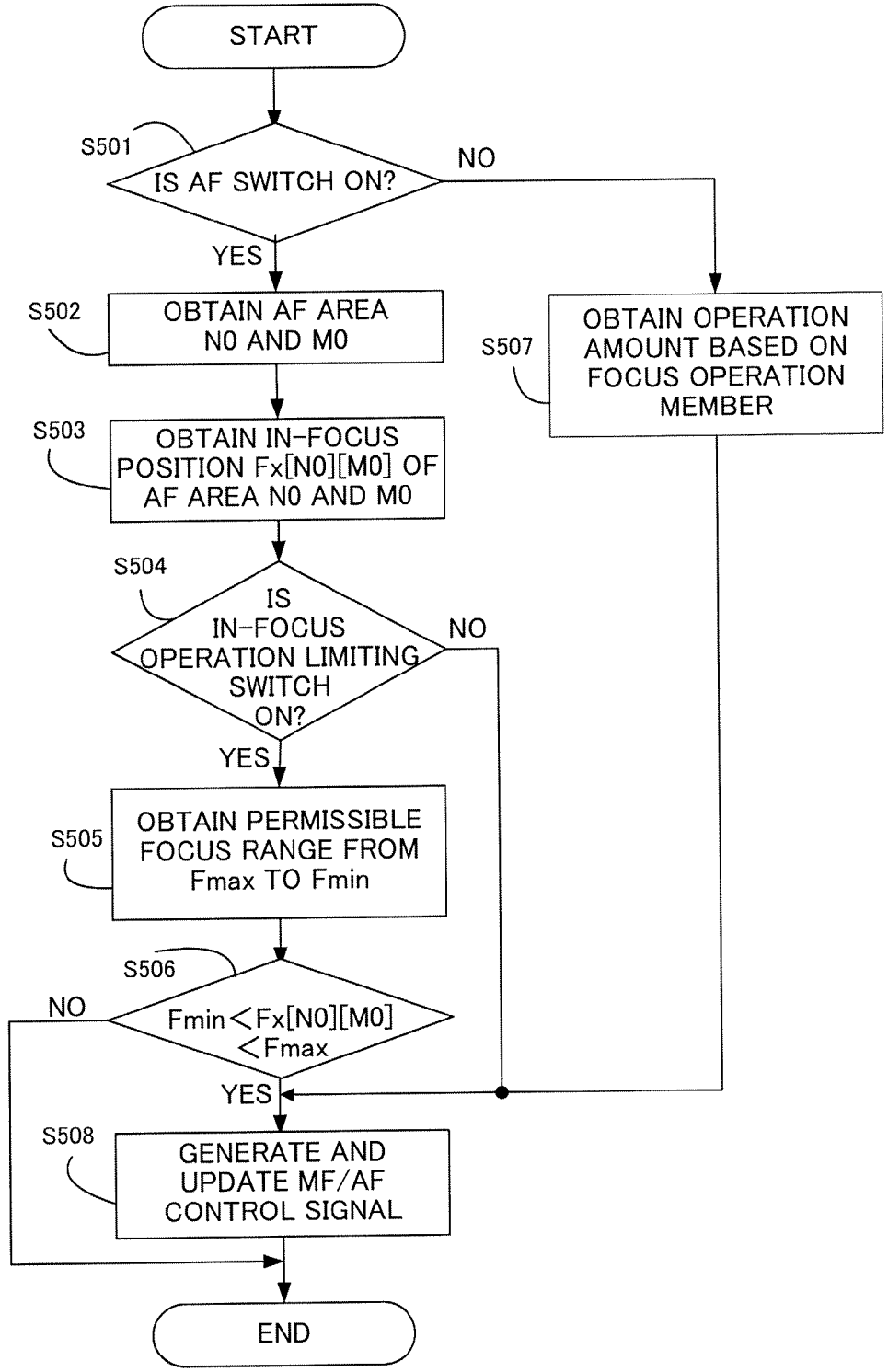
FIG. 10 is a flowchart showing the focus control process in Embodiment 1.

It is noted that the focus control process performs the processes shown in FIG. 10 as in Embodiment 1. However, the in-focus position obtained in Step 503 uses the in-focus position Fx[N0'][M0'] at the reference area N0' and M0'.

Through the processes as described above, the focus detection areas other than the AF area candidate selected by the AF area control process as a selectable area from among a plurality of the focus detection areas are prevented from being selected even when the AF area selection switch 16 is operated. Furthermore, the AF area candidate is determined based on the permissible focus range that is arbitrarily set by the operator through the permissible focus range setting volume 20 (i.e., based on the permissible focus range reflecting the intention of the operator). Thus, the selection AF area can be changed with a reduced number of wasteful operations of the AF area selection switch 16 to reduce the burdens to the operator and the operator can quickly select the AF area for which focusing is desired to be made.

Figure 15A:
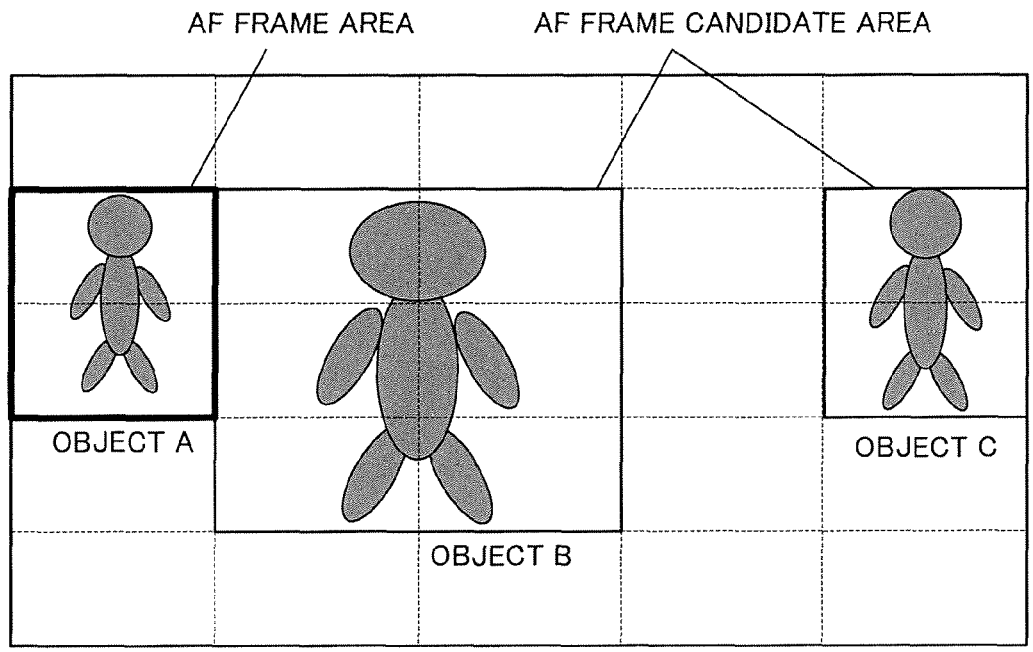
FIGS. 15A and 15B show an effect of Embodiment 2.
Figure 15B:
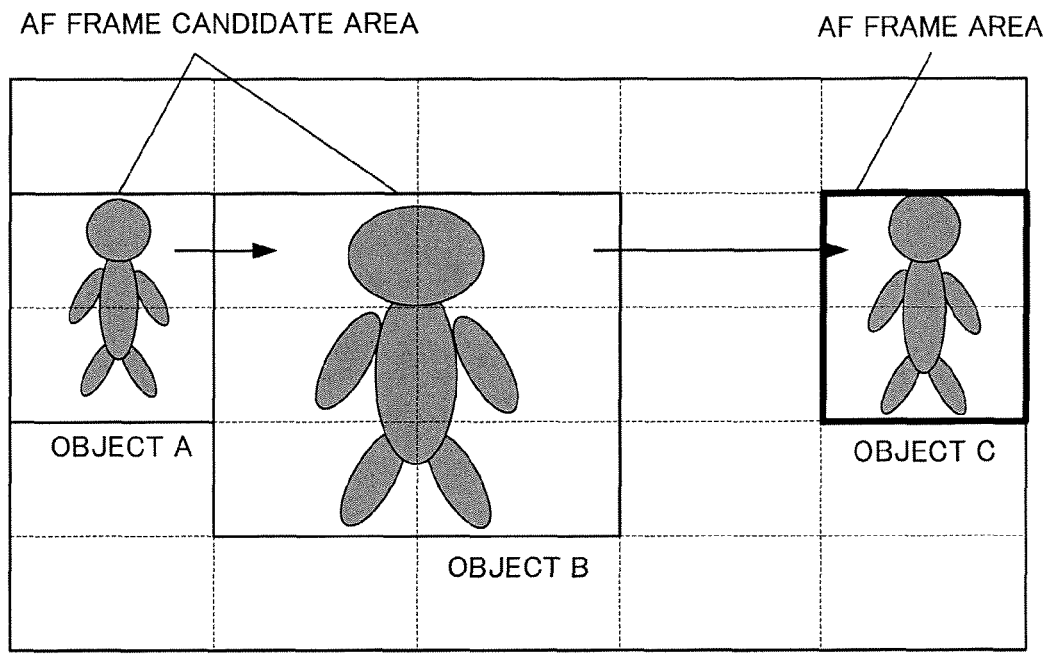

Furthermore, two or more AF areas including a plurality of portions of the same object have a high probability where the same or close in-focus position is obtained. Thus, the two or more AF areas can be selected as one pair of AF areas as shown in FIGS. 15A and FIG. 15B. Thus, it is not required to move the selection AF area between the two or more AF areas and thus the burden to the operator in the AF area selecting operation can be reduced.

In FIG. 15A and FIG. 15B, three objects A, B, and C any of which is within the permissible focus range exist within the image-pickup area. The object A and the object C exist at the left and right sides of the object B in the vicinity of the center, respectively.

The object B is originally (i.e., specifically in Embodiment 1) included in 6 focus detection areas (AF area candidates) among the 25 focus detection areas (2 focus detection areas in the horizontal direction). According to this embodiment, the 6 AF area candidates can be selected as one combination of the AF candidate areas. Thus, when the selection AF area is moved from the AF area candidates corresponding to the object A to the AF area candidates corresponding to the object C, the operator only has to operate the AF area selection switch 16 two times in this embodiment (in contrast with a conventional case where the operator has to operate the AF area selection switch 16 three times). Although the examples of FIG. 15A and FIG. 15B show 25 minimum units of the focus detection area, increasing number of the minimum units can further enhance the effect for reducing the burdens in the operation.

As described above, according to the above respective embodiments, the detection area other than an area that is determined from among a plurality of the detection areas as a selectable area based on information for the focus control is prevented from being selected even when a selecting operation means is operated. Specifically, when an unselectable detection area exists between the currently-selected detection area and other selectable detection areas, the selected area is moved to jump over the unselectable detection area. This can reduce the number of the operations of the selecting operation means required to select the detection area to reduce the burdens to the operator and to allow operator to quickly select the detection area for which focusing is desired to be made.

Furthermore, the present invention is not limited to these embodiments and various variations and modifications may be made without departing from the scope of the present invention.

For example, although the above respective embodiments have described a case where a so-called inner measurement phase difference signal is used as information used for the focus control, a distance measuring signal corresponding to the object distance (e.g., an outer measurement phase difference signal in a triangle distance measurement) also may be used as information regarding the focus control.

Alternatively, a contrast signal (AF evaluation value signal) generated by extracting a high-frequency component of a video signal obtained by the use of an image-pickup element or information therefrom also may be used as information used for the focus control.

Although the above respective embodiments have described the zoom lens apparatus detachably attached to a camera, the present invention also can be applied to a camera integrated with a lens (optical apparatus).

This application claims the benefit of Japanese Patent Application No. 2007-100110, filed on Apr. 6, 2007, which is hereby incorporated by reference herein in its entirety.

What is claimed is:

1. An optical apparatus comprising:
a detector that detects information used for focus control in each of a plurality of detection areas set in an image-pickup area;

a selecting member that is operated to change a selected area selected from the plurality of the detection areas; and a controller that performs the focus control based on the information used for the focus control detected by the detector in the selected area, wherein the controller, based on the information used for the focus control and detected in each of the detection areas, determines a detection area where the information used for the focus control is within a first predetermined range as a selectable detection area among the plurality of the detection areas and changes the selected area among the selectable detection areas in response to the operation of the selecting member.

2. The optical apparatus according to claim 1, wherein the optical apparatus includes a first changing operation member operated to change the first predetermined range.

3. The optical apparatus according to claim 1, wherein the controller sets the first predetermined range with reference to a current focus position.

4. The optical apparatus according to claim 1, wherein the controller sets the first predetermined range with reference to a target in-focus position.

5. The optical apparatus according to claim 1, wherein the controller causes a display element to display the selected area and a non-selected selectable area among the plurality of the detection areas.

6. The optical apparatus according to claim 1, wherein, when the information used for the focus control in each of at least two detection areas adjacent to each other among the plurality of the detection area is within a second predetermined range, the controller allows the at least two detection areas adjacent to each other to be selected as one combination of detection areas through the operation of the selecting member.

7. The optical apparatus according to claim 6, wherein the optical apparatus includes a second changing operation member operated to change the second predetermined range.

8. The optical apparatus according to claim 6, wherein the controller variably sets the second predetermined range in accordance with the information relating to an image-pickup optical system.

9. The optical apparatus according to claim 1, wherein the information used for the focus control is information relating to a phase difference of a plurality of optical images formed by light fluxes from an image-pickup optical system.

* * * * *